US011192813B2

(12) United States Patent
Swanson et al.

(10) Patent No.: US 11,192,813 B2
(45) Date of Patent: Dec. 7, 2021

(54) FILTER SYSTEM INCLUDING AN ACTIVATED CARBON BLOCK FOR REMOVING PARTICLES, ORGANIC CONTAMINANTS, AND MICROORGANISMS FROM A FLUID

(71) Applicants: Shane Swanson, Leander, TX (US); Charles Swanson, Escondido, CA (US)

(72) Inventors: Shane Swanson, Leander, TX (US); Charles Swanson, Escondido, CA (US)

(*) Notice: Subject to any disclaimer, the term of this patent is extended or adjusted under 35 U.S.C. 154(b) by 257 days.

(21) Appl. No.: 16/043,072

(22) Filed: Jul. 23, 2018

(65) Prior Publication Data

US 2020/0024174 A1  Jan. 23, 2020

Related U.S. Application Data

(60) Provisional application No. 62/535,467, filed on Jul. 21, 2017.

(51) Int. Cl.
| | |
|---|---|
| *C02F 1/28* | (2006.01) |
| *C02F 9/00* | (2006.01) |
| *B01D 29/11* | (2006.01) |
| *B01D 29/56* | (2006.01) |
| *C02F 1/50* | (2006.01) |
| *C02F 1/00* | (2006.01) |

(52) U.S. Cl.
CPC .............. *C02F 9/005* (2013.01); *B01D 29/11* (2013.01); *B01D 29/56* (2013.01); *C02F 1/002* (2013.01); *C02F 1/283* (2013.01); *C02F 1/50* (2013.01); *C02F 2209/03* (2013.01); *C02F 2209/40* (2013.01); *C02F 2303/04* (2013.01)

(58) Field of Classification Search
None
See application file for complete search history.

(56) References Cited

U.S. PATENT DOCUMENTS

| 5,431,816 A  * | 7/1995 | Aldred ................... B01D 35/26 |
| | | 210/416.3 |
| 2004/0084378 A1* | 5/2004 | Koslow .................... B01J 20/08 |
| | | 210/679 |
| 2009/0001011 A1* | 1/2009 | Knipmeyer ............. C02F 1/003 |
| | | 210/266 |
| 2012/0085687 A1* | 4/2012 | Simonette ............ B01D 61/025 |
| | | 210/96.2 |
| 2015/0344321 A1* | 12/2015 | Alsip ...................... C02F 1/001 |
| | | 210/253 |
| 2016/0318786 A1* | 11/2016 | Compere ................ C02F 1/283 |

* cited by examiner

*Primary Examiner* — Matthew O Savage
(74) *Attorney, Agent, or Firm* — Michael Best & Friedrich LLP

(57) ABSTRACT

Systems and methods of filtering particulate matter from a fluid are provided. In one exemplary embodiment, a system for filtering particulate matter having suspended particles, organic contaminants, and microorganisms from a fluid comprises a main filter assembly having an activated carbon block disposed therein. The carbon block has distributed pores with a diameter of less than one micron. Further, the carbon block is operable to filter all of the particulate matter having a diameter or a non-spherical width of at least 0.45 microns from the fluid, and adsorb the particulate matter having a diameter or a non-spherical width of at least 0.003 microns from the fluid.

11 Claims, 14 Drawing Sheets

FILTER SYSTEM INCLUDING AN ACTIVATED CARBON BLOCK FOR REMOVING PARTICLES, ORGANIC CONTAMINANTS, AND MICROORGANISMS FROM A FLUID

CROSS-REFERENCE TO RELATED APPLICATIONS

This application claims benefit under 35 U.S.C. § 119(e) to U.S. Prov. App. No. 62/535,467, filed Jul. 21, 2017, which is hereby incorporated by reference as if fully set forth herein.

FIELD OF DISCLOSURE

The present disclosure relates generally to the field of filtration, and in particular to filtering particulate matter from a fluid.

BACKGROUND

Small Unit Water Purifiers (SUWP) are portable water purification systems usually used in the field or more austere conditions. An SUWP has the means to intake water whether it be from a hand pump or an electrically powered pump. Once the fluid (e.g., contaminated water) is pumped into the system, the fluid is forced through a filter or series of filters to remove particulate matter such as suspended particles, organic contaminants (e.g., carbon-based compounds), microorganisms (e.g., parasites, viruses, bacteria, spores, fungi, algae, and the like). After the fluid is filtered, it is dispensed to fulfill the requirements for a variety of purposes such as human consumption, and medical, pharmacological, chemical, or industrial applications. An SUWP is generally a self-contained system.

The need for clean water has always and will always be present but the effort to purify water is not a new one. There are many methods available to purify water such as slow sand filtration, reverse osmosis, ultraviolet (UV) light contact and carbon block filtration. Each of the previous methods have their own set of issues especially when placed into an austere environment where dependability and limited resources are major factors.

Slow sand filtration is a method where the user will have a container that they put a corrugated tube at the bottom then cover with rocks, gravel, dirt, and sand. The water is then run through the system where it filters down to the tubing and is let out of the container. Time is needed for bacteria to grow on top of the sand which will feed on contaminants in the water this is not ideal because the growth of bacteria is not always guaranteed as this is considered an improvised method of filtration.

Reverse Osmosis is a process in which contaminated water is forced at high pressure through a semipermeable membrane which allows water to pass through while rejecting the contaminants. The contaminants are then discarded through a reject stream and the clean water is dispensed for the user to drink. There are several issues with reverse osmosis in a field environment. First of which is the amount of power needed. The pressure needed to cause reverse osmosis varies depending on the concentration of contaminants in the water. Higher pressure requires a pump strong enough to do so and a large amount of power to operate. The second issue with reverse osmosis is the creation of wastewater. This wastewater needs to be disposed of which is not always a good option for those already living in an austere environment, and if the wastewater is put back into the original water source it serves to super concentrate the water source, which increases the power generation needs to filter the water.

Filtration through UV light is a process in which water is exposed to UV light for a period of time which allows the UV light to destroy the deoxyribonucleic acid (DNA) of organisms in the water. By destroying the DNA of organisms in the water, they are unable to reproduce and therefore, unable to infect other organisms. This is an effective method of water filtration but dependability is an issue. UV light bulbs are the primary method of filtration in this system and are not well suited to harsh conditions because if the bulb breaks, then the system is unable to purify water.

Carbon block filtration uses a solid block of carbon as the main method of water filtration. Water passes through the carbon block and is purified. Regular carbon block matrix filters are manufactured through the continuous extrusion method. This method produces carbon block material with ratings of one to twenty microns. These types of carbon blocks are wrapped with a layer of absolute membrane material in order to claim to be 1.0 to 0.5 or even 0.2-micron absolute. The viral barrier is assured by a thin membrane material which is put under full force of the water entry. These membranes are usually pleated to lower the surface stress and can only have the outer surface area to lower the applied stress which leads to increased chances for viral passage.

Others have tried to solve the problem of delivering purified drinking water in austere environments in the past but each solution has its own set of problems. One SUWP system performs desalination through reverse osmosis which has a large demand for power generation, which is not always available in lesser developed areas of the world, and also produces wastewater. Another SUWP system has a robust and programmable electronic control system that has been known to have electronic failures in austere environments for reasons such as dirt, heat, and shock from impact, which are all common in the environment SUWP's are intended for use. When this SUWP system has an electronic failure, the purifier is rendered unusable and must be sent back to the manufacturer for repair which is not a viable solution if this is your only water source. Another SUWP system includes carbon block filtration but uses an impeller pump, which can fail without constant contact with water to prevent overheating. This SUWP system also hard mounts their filter housings together and does not seem to have a built-in sediment kit which allows large contaminants to come in contact with the filters and runs the risk of prematurely damaging the filters.

Accordingly, there is a need for improved techniques for filtering particulate matter from a fluid. In addition, other desirable features and characteristics of the present disclosure will become apparent from the subsequent detailed description and embodiments, taken in conjunction with the accompanying figures and the foregoing technical field and background. The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

The present disclosure relates to systems and methods of filtering particulate matter from a fluid. According to one aspect, a system for filtering particulate matter having suspended particles, organic contaminants, and microorganisms from a fluid comprises a main filter assembly having an activated carbon block disposed therein. The carbon block has distributed pores with a diameter of less than one micron and is operable to filter all of the particulate matter having a diameter or a non-spherical width of at least 0.45 microns from the fluid and adsorb the particulate matter having a diameter or a non-spherical width of at least 0.003 microns from the fluid.

According to another aspect, the system includes a first pre-filter assembly having a first filter media disposed therein that is operable to filter the particulate matter having a diameter or a non-spherical width in a range of five to twenty microns from the fluid.

According to another aspect, the first pre-filter assembly is arranged to filter the fluid prior to the main filter assembly.

According to another aspect, the system includes a second pre-filter assembly having activated carbon disposed therein. The activated carbon has distributed pores with a diameter of no more than five microns and is operable to filter the particulate matter having a diameter or a non-spherical width in a range of one to five microns from the fluid.

According to another aspect, the second pre-filter assembly is arranged to filter the fluid after the first pre-filter assembly but prior to the main filter assembly.

According to another aspect, the system includes a third pre-filter assembly having an antimicrobial agent disposed therein that is operable to kill or slow a growth of the microorganisms in the fluid.

According to another aspect, the antimicrobial agent includes silver nitrate.

According to another aspect, the third pre-filter assembly is operable to filter the particulate matter having a diameter or a non-spherical width in a range of one to five microns.

According to another aspect, the third pre-filter assembly is arranged to filter the fluid after the first and second pre-filter assemblies but prior to the main filter assembly, and the first pre-filter assembly is arranged to filter the fluid prior to the second pre-filter assembly.

According to another aspect, the arrangement of the first, second and third pre-filter assemblies and the main filter assembly is operable to allow the main filter assembly to filter a greater volume of fluid prior to reaching its end-of-life than any other arrangement of the first, second and third pre-filter assemblies and the main filter assembly.

According to another aspect, the arrangement of the first, second and third pre-filter assemblies and the main filter assembly is operable to allow the main filter assembly to filter at least 20% greater volume of the fluid prior to reaching its end-of-life than any other arrangement of the first, second and third pre-filter assemblies and the main filter assembly.

According to another aspect, the system includes a filter screen disposed in an intake port and operable to filter the particulate matter having a diameter or a non-spherical width of at least 0.297 millimeters from the fluid.

According to another aspect, the filter screen filters the fluid prior to the first, second, and third pre-filter assemblies and the main filter assembly.

According to another aspect, the system includes an intake port operable to receive the fluid to be filtered by the system. Further, the screen is disposed in the intake port.

According to another aspect, the activated carbon block is a compressed, food-grade, activated coconut carbon block.

According to another aspect, the system includes a flow rate sensor operable to indicate a rate of flow of the fluid through the system.

According to another aspect, the system includes a pump operable to pump the fluid from an intake port of the system to the first pre-filter assembly.

According to another aspect, the pump is a diaphragm pump that is operable to operate without any flow of fluid through the system and without damaging the pump.

According to another aspect, the system includes a flow regulator operable to regulate an amount of flow of fluid through the system.

According to another aspect, the flow regulator is arranged between the pump and the first pre-filter assembly.

According to another aspect, the flow regulator is further operable to shut-off a flow of the fluid through the flow regulator responsive to a pressure of the flow of the fluid through the flow regulator being at least a first threshold.

According to another aspect, the first threshold is sixty-two pounds per square inch (psi).

According to another aspect, the flow regulator is further operable to enable a first indication (e.g., light emitting diode (LED)) responsive to the pressure of the flow of the fluid through the flow regulator being at least the first threshold.

According to another aspect, the system includes a pressure gauge arranged at an inlet port to the main filter and operable to monitor a flow of fluid to the main filter, and enable a second indication (e.g., LED) responsive to the pressure of the flow of the fluid to the main filter being at least a second threshold.

According to another aspect, the second threshold is sixty-two psi.

According to another aspect, a combination of the first and second indications indicate the following status of the filters in the system:

| First Indication | Second Indication | Status of Filters |
|---|---|---|
| Disabled | Disabled | All Filters Operating |
| Disabled | Enabled | Main Filter Reached End-of-Life |
| Enabled | Disabled | Replace Filter Media of First Pre-Filter |
| Enabled | Enabled | Check Status of All Filter Media |

According to another aspect, the system includes an intake port operable to receive the fluid to be filtered by the system.

According to another aspect, the system includes an output port operable to output fluid that is filtered by the system.

According to one aspect, a method of filtering particulate matter having suspended particles, organic contaminants, and microorganisms from a fluid comprises filtering, by a main filter assembly having an activated carbon block disposed therein, all particulate matter having a diameter or a non-spherical width of at least 0.45 microns from the fluid from the liquid. The carbon block has distributed pores with a diameter of less than one micron. Further, the method includes adsorbing particulate matter having a diameter or a non-spherical width of at least 0.003 microns from the fluid.

According to another aspect, the method includes filtering, by a first pre-filter assembly having a pleated filter media disposed therein, the particulate matter having a diameter or a non-spherical width in a range of five to twenty microns from the fluid.

According to another aspect, the first pre-filter assembly filters the fluid prior to the main filter assembly.

According to another aspect, the method includes filtering, by a second pre-filter assembly having activated carbon disposed therein, the particulate matter having a diameter or a non-spherical width in a range of one to five microns from the fluid. The activated carbon has distributed pores with a diameter of five microns or less.

According to another aspect, the second pre-filter assembly filters the fluid after the first pre-filter assembly but prior to the main filter assembly.

According to another aspect, the method includes killing, destroying, or slowing the growth of the microorganisms in the fluid using a third pre-filter assembly having an antimicrobial agent disposed therein.

According to another aspect, the third pre-filter assembly filters the fluid after the first and second pre-filter assemblies but prior to the main filter assembly.

According to another aspect, the third pre-filter assembly is arranged to filter the fluid after the first and second pre-filter assemblies but prior to the main filter assembly, and the first pre-filter assembly is arranged to filter the fluid prior to the second pre-filter assembly.

According to another aspect, the arrangement of the first, second and third pre-filter assemblies and the main filter assembly is operable to allow the main filter assembly to filter a greater volume of the fluid prior to reaching its end-of-life than any other arrangement of the first, second and third pre-filter assemblies and the main filter assembly.

According to another aspect, the arrangement of the first, second and third pre-filter assemblies and the main filter assembly is operable to allow the main filter assembly to filter at least 20% greater volume of the fluid prior to reaching its end-of-life than any other arrangement of the first, second and third pre-filter assemblies and the main filter assembly.

According to another aspect, the method includes filtering, by a filter screen, the particulate matter having a diameter or a non-spherical width of at least 0.297 millimeters from the fluid.

According to another aspect, the filter screen filters the fluid prior to the first, second, and third pre-filter assemblies and the main filter assembly.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 1A illustrates the system with the filter housings. FIG. 1B illustrates a portion of the system of FIG. 1A. FIG. 1C illustrates the filter section of the system of FIG. 1A without the filter media in the housings.

FIG. 1D illustrates the filter section of the system of FIG. 1A with each filter housing having a corresponding filter media. FIG. 1E illustrates a portion of the system of FIG. 1A that includes a controller assembly and a pump assembly. FIG. 1F illustrates the controller assembly of the system of FIG. 1A. FIG. 1G illustrates the pump assembly of the system of FIG. 1A.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

This disclosure includes describing systems and methods of filtering particulate matter such as suspended particles, organic contaminants, and/or microorganisms from a fluid. The particulate matter may be spherical or non-spherical. For non-spherical particulate matter having a length and a width, the length is greater than the width. The systems and methods described herein provide purified drinking water to people in austere environments in the most reliable way possible by eliminating or reducing problems with current systems. The problems with these current systems were discovered through their use in Africa, where the these current systems regularly fail for a variety of reasons such as electrical failures, broken ultraviolet (UV) bulbs, water pump failure such as caused by a lack of fluid through the system, cracked seals, impeller failure such as caused by a lack of fluid through the system, and the like.

Figure 1A:
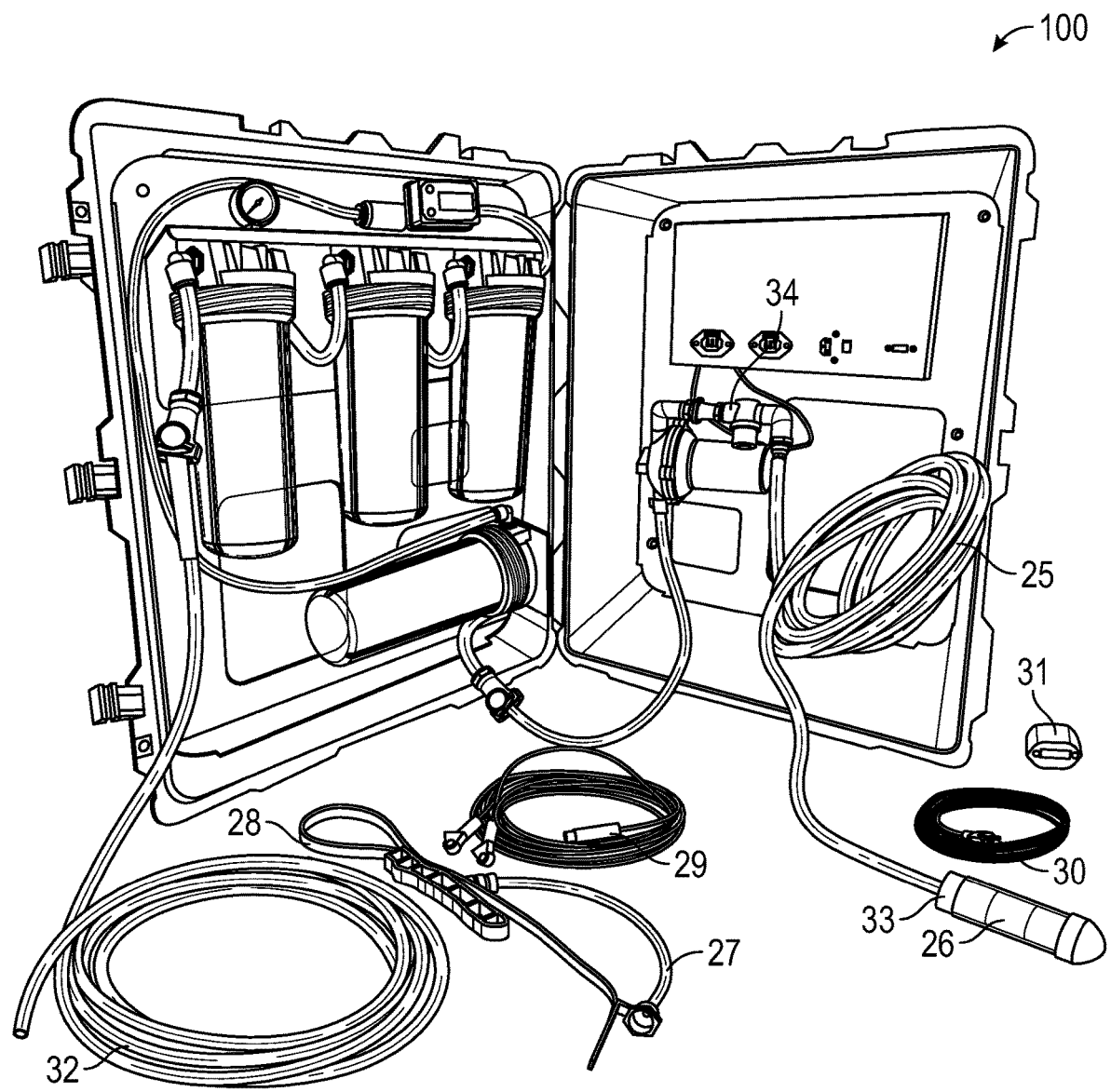
FIGS. 1A-G illustrate different views of one embodiment of a system for filtering particulate matter having suspended particles, organic contaminants, and/or microorganisms from a fluid in accordance with various aspects as described herein.
Figure 1B:
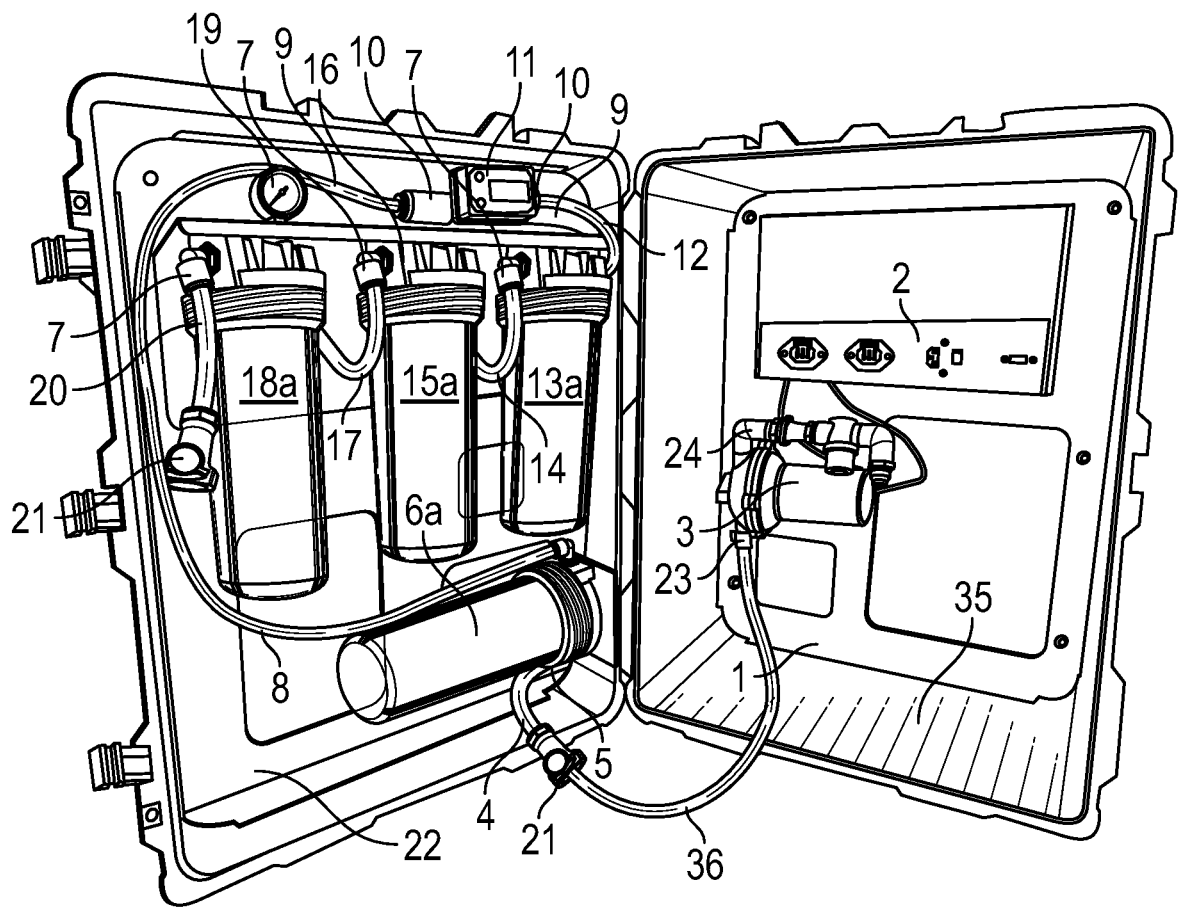

FIGS. 1A-G illustrate different views of one embodiment of a system 100 for filtering particulate matter having suspended particles, organic contaminants, and/or microorganisms from a fluid in accordance with various aspects as described herein. In FIGS. 1A-B, the system 100 generally functions like other small unit water purification (SUWP) systems by allowing the intake of water that is then forced through a series of filters to produce clean drinking water. Water may be obtained from any source (e.g., rivers, ponds, rain storage, contaminated city water, and the like). A suction hose 25 may allow the intake of a fluid having particulate matter (e.g., suspended particles, organic contaminants, microorganisms, or the like) to the system 100. In one example, the suction hose 25 has a length in a range from one foot to one hundred feet. In another example, the hose is twenty-five feet in length. The first end of the suction hose 25 may be coupled to a suction strainer 26 that is used to reduce sediment entering the suction hose 25. In one example, the suction strainer 26 is a five and one-half inch (5½") brass suction strainer. The suction strainer 26 may be covered with a filter sock 33 (e.g., clock sock) to further reduce sediment entering the system. The filter sock 33 may be washed or rinsed and then reused as often as needed.

Figure 2A:
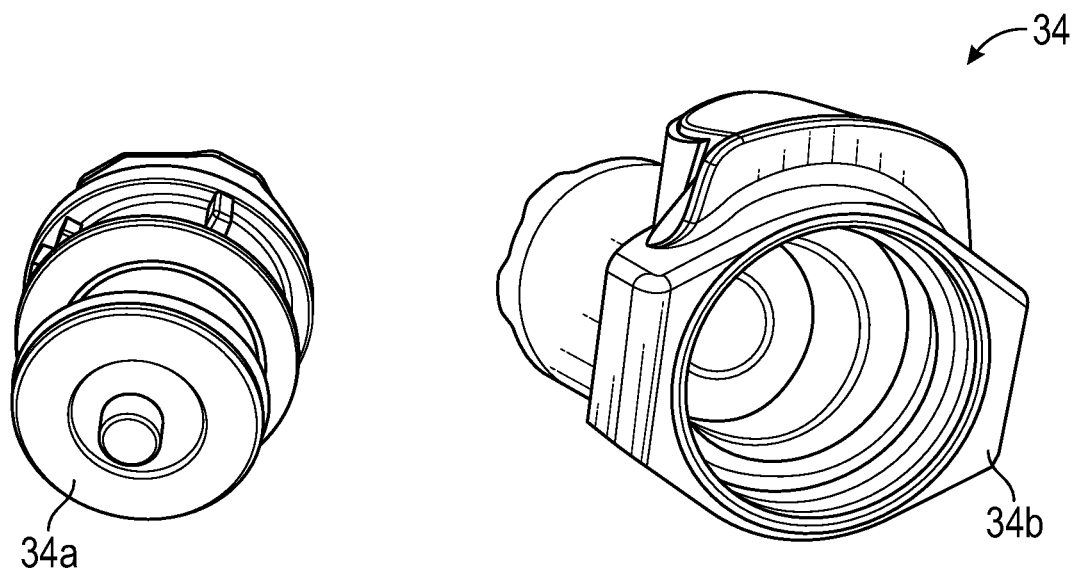
FIGS. 2A-B illustrate different views of a quick disconnect fitting to attach a dispensing hose.
Figure 2B:
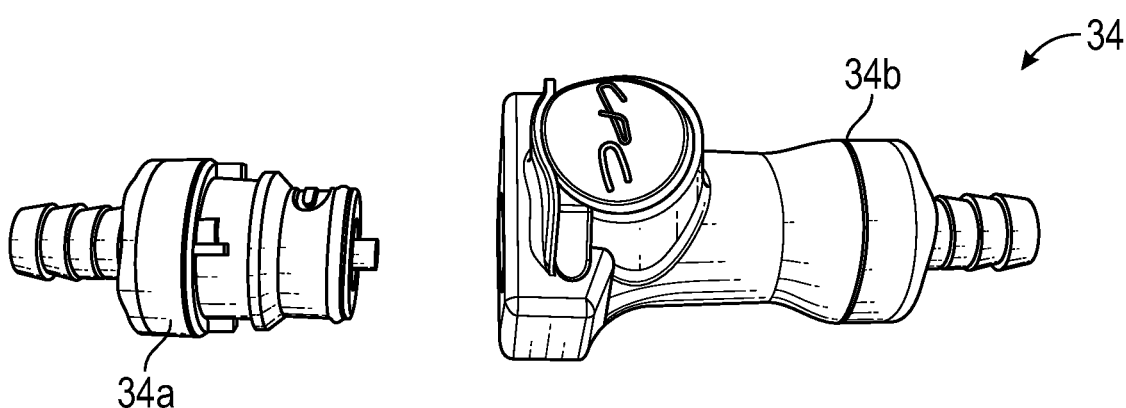

In FIG. 10, the other end of the suction hose 25 may be coupled to an inlet port of a pump assembly 3 via a fitting 24 (e.g., 90° national pipe thread (NPT) fitting) having a pump 3a and a regulator 3b. A secondary suction screen filter with fitting 34 (e.g., bowl type screen filter with quick disconnect fittings, as shown in FIGS. 2A-B) may be coupled between the intake port of the pump assembly 3 and the other end of the suction hose 25. In one example, the pump 3a is a diaphragm pump such as a five stage thermoplastic elastomer santoprene) diaphragm with corrosion resistant valves that is self-priming and can run dry without damage to the pump 3a, unlike the more commonly used impeller pump. The regulator 3b may have a built-in safety mechanism to stop the flow of the liquid when the pressure is at least a certain pressure threshold (e.g., 60 pounds per square inch (psi)) to avoid damaging internal components of the pump 3a. The pump 3a may then resume pumping the fluid when the pressure drops below the certain threshold. The pumped liquid is output to an outlet port of the pump 3a. The outlet port of the pump 3a is coupled to one end of a pump output hose 36 via a fitting 23. In one example, the fitting 23 is a female straight hose barb fitting. The other end of the pump output hose 25 is coupled to an outlet port fitting 21. In one example, the outlet port fitting 21 is a quick disconnect fitting. In another example, the outlet port fitting 21 is a half inch (½") NPT swivel fitting, which allows the collar of the fitting to turn rather than the hose which negates kinking or tangling of the hose. An optional spigot adapter 27 is operable to connect the system 100 to spigot such as to use a water source via the spigot in rural areas where there is access to running water. When using the spigot adapter 27, the pump 3a and the regulator 3b are bypassed while continuing to safely filter the fluid (e.g., water) by the system 100. By bypassing the pump 3a and the regulator 3b, the fluid enters a first pre-filter assembly 6 having a first pre-filter housing 6a and a first pre-filter media 6b.

Figure 1C:
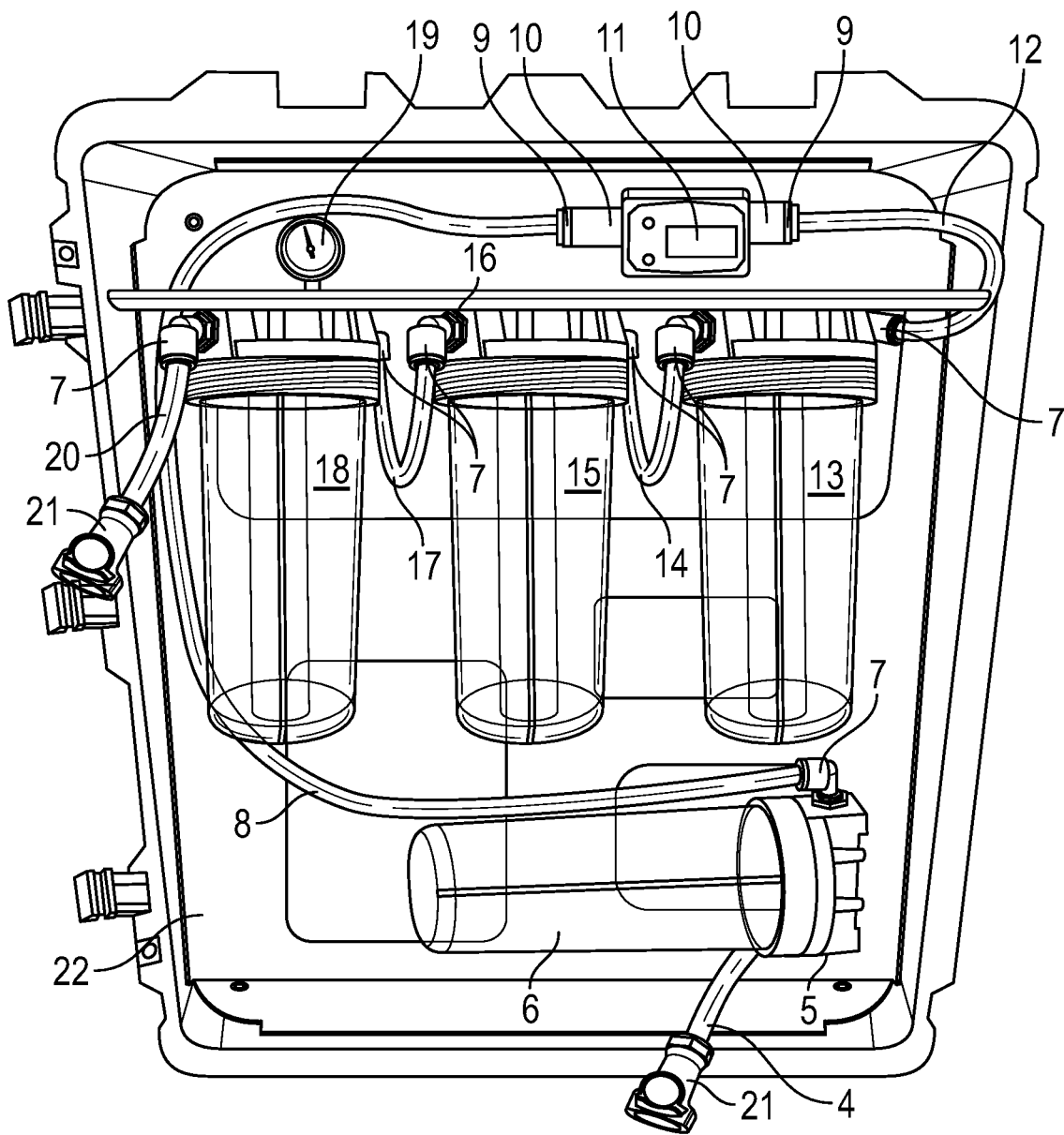
Figure 1D:
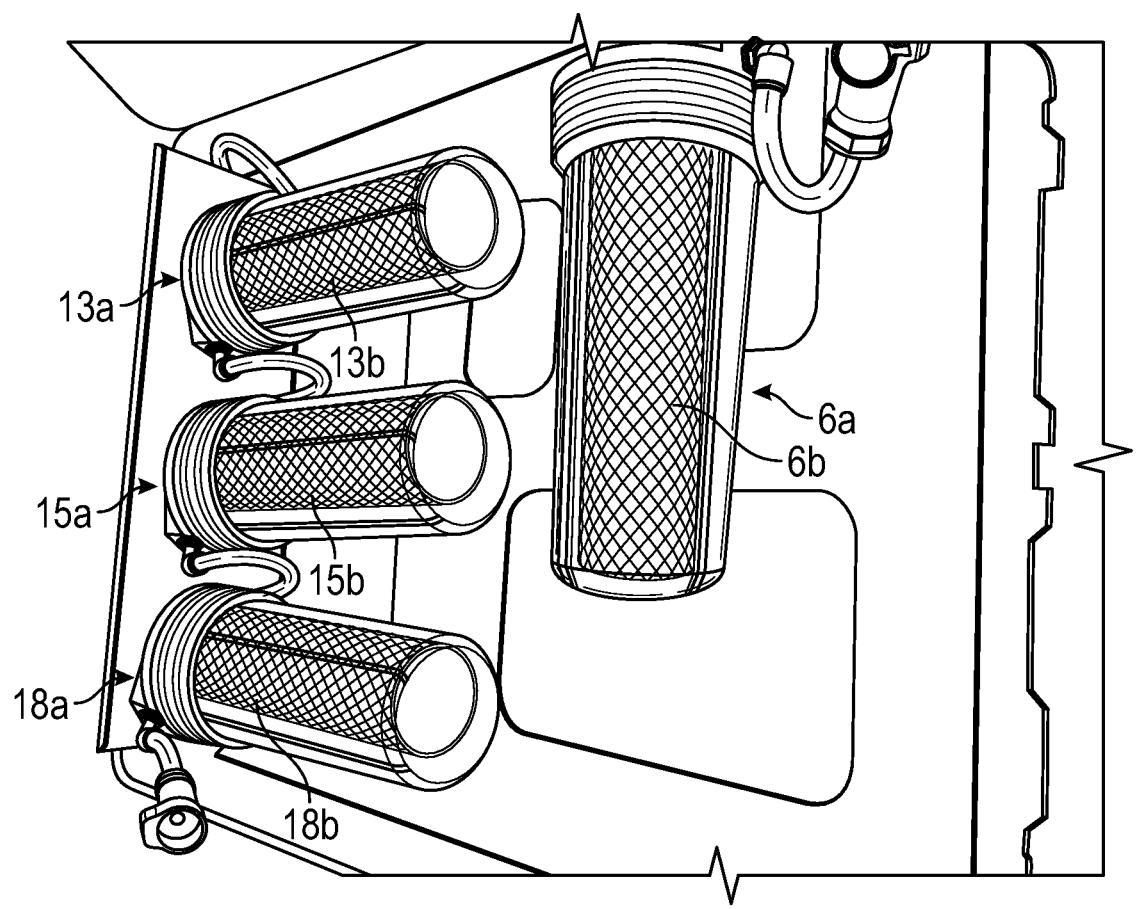
Figure 1E:
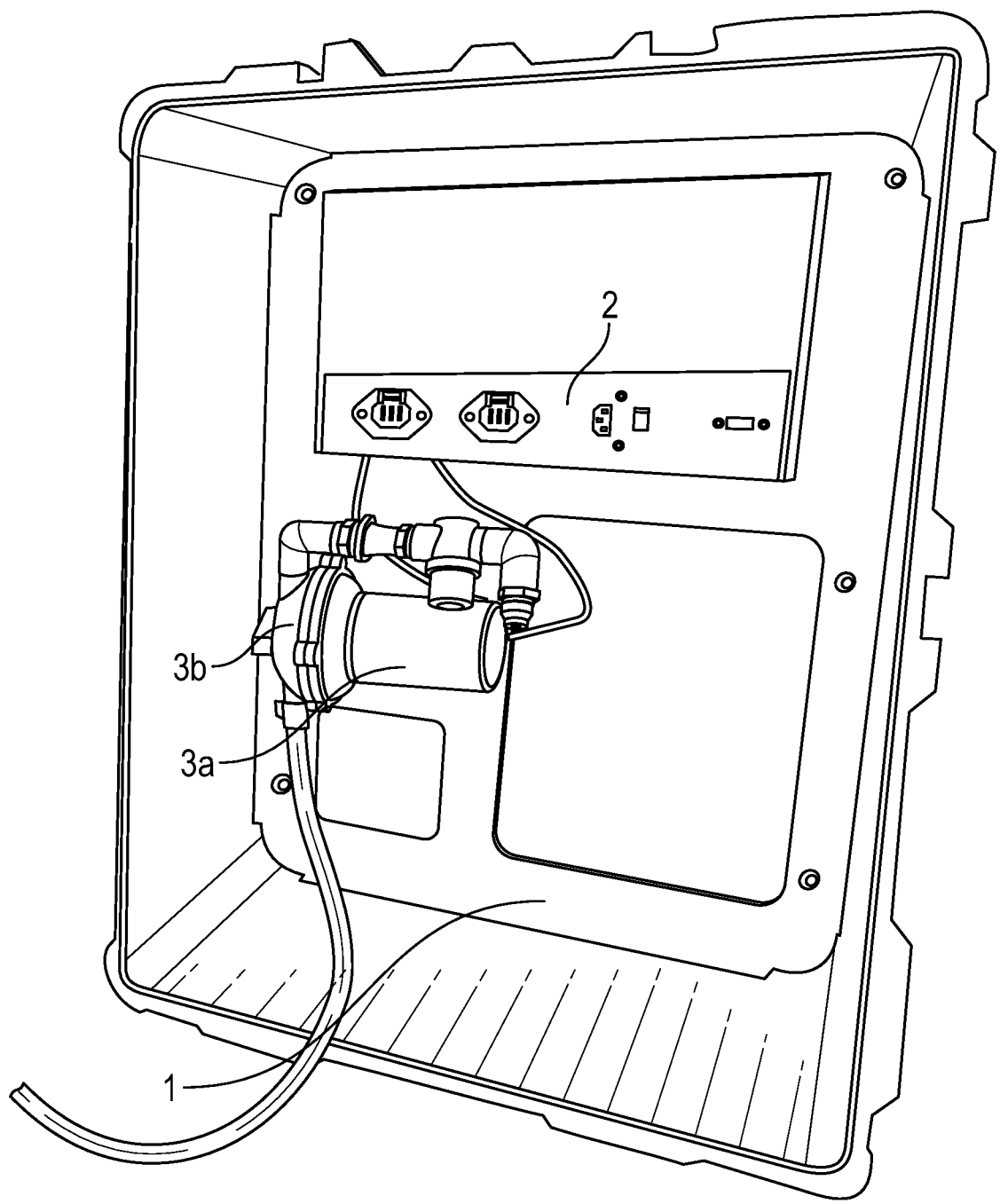
Figure 1F:
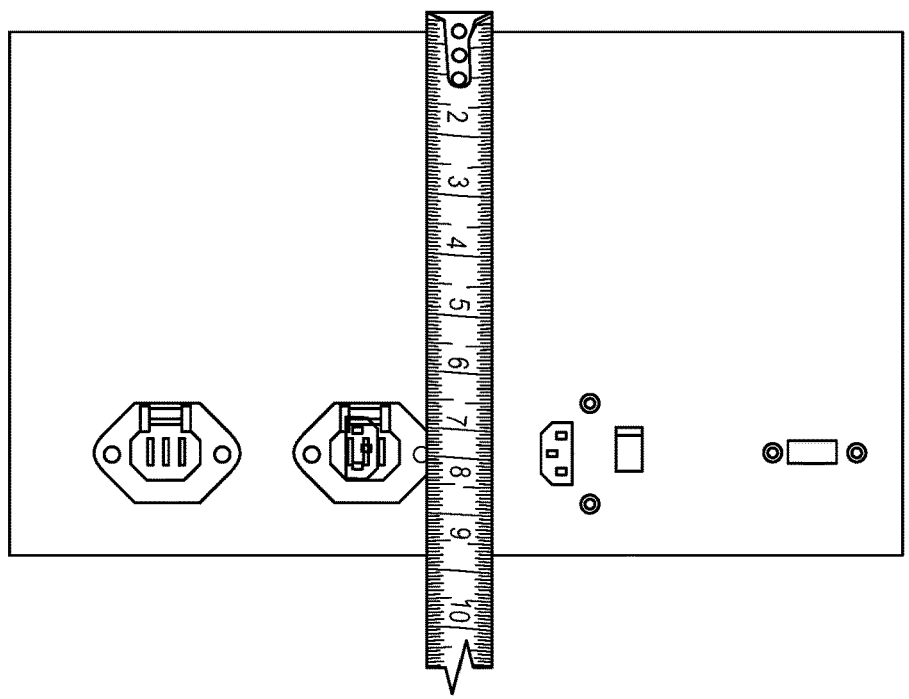
Figure 1G:
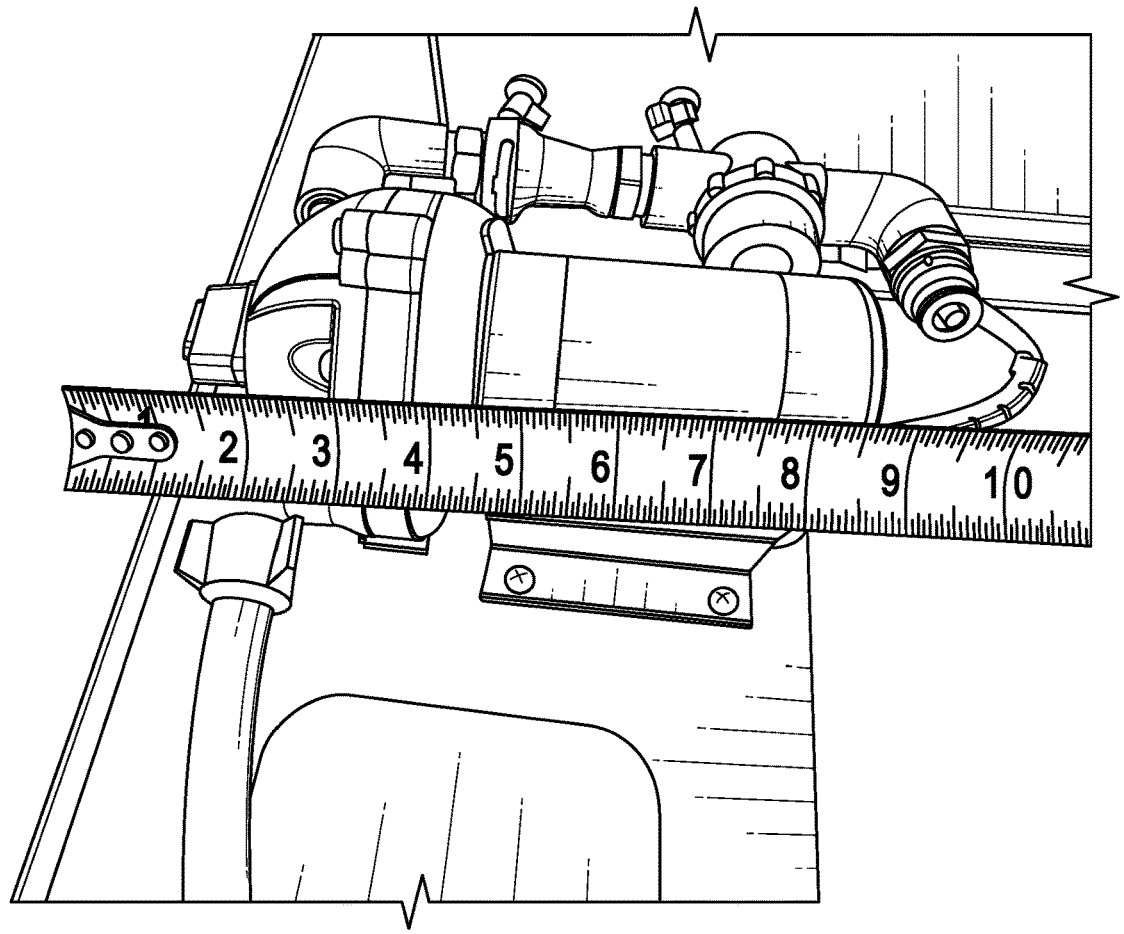

In FIGS. 1C-D, one end of an intake hose 4 is coupled to the outlet port fitting 21. The outlet port fitting 21 is operable to allow the optional spigot connection 27 or the pump output hose 36 to be quickly connected or disconnected without any unfiltered fluid entering the system 100. The other end of the intake hose 4 is coupled to the first pre-filter assembly 6 via a fitting 5 (e.g., hose barb 90° fitting). In one example, the first pre-filter media 6b is a pleated sediment filter for added debris-holding capacity and is rated at twenty microns. After the fluid is filtered by the first pre-filter media 6b disposed in the first pre-filter housing 6a, the filtered fluid is transferred through a hose 8 (e.g., ½" OD flexible hose, which may be 41" long) to a flow meter 11. The hose 8 is coupled to the flow meter 11 via a fitting 9 (e.g., straight brass pinch lock fitting) and a fitting 10 (e.g., slip fitting). The outlet port of the first pre-filter housing 6a is coupled to the hose 8 via a fitting 7 (e.g., 90° pinch lock fitting). Each fitting 7 may also be paired with an adaptor 16 that connects to a port of a filter housing. In one example, the adaptor 16 is a ¾" by ½" brass adaptor. The flow meter 11 may display both the total cumulative flow from when one or more of the filter media was changed, a current flow rate of fluid through the system 100, or the like.

After the fluid passes the flow meter 11, the fluid is transferred by a hose 12 (e.g., ½" OD transfer tube, which may be 10" long) to a second pre-filter assembly 13. One end of the hose 12 is coupled to the flow meter 11 via the fittings 9, 10. The other end of the hose 12 is coupled to the second pre-filter assembly 13 via the fitting 7. The second pre-filter assembly 13 includes a second pre-filter media 13b disposed in a second pre-filter housing 13a. The second pre-filter media 13b is operable to filter the fluid. In one example, the second pre-filter media 13b is a carbon block micro-filter rated at five microns or less.

After the fluid is filtered by the second pre-filter media 13b, the fluid is transferred by a hose 14 (e.g., ½" OD transfer tube, which may be 10" long) to a third pre-filter assembly 15. One end of the hose 14 is coupled to the second pre-filter housing 13a via the fitting 7. The other end of the hose 14 is coupled to the third pre-filter housing 15a via the fitting 7. The third pre-filter assembly 15 includes a third pre-filter media 15b disposed in a third pre-filter housing 15a. The third pre-filter media 15b is operable to filter the fluid. In one example, the third pre-filter 15b is a nano-silver activated carbon filter. In another example, the third pre-filter 15b is a nano-silver activated carbon filter made of coconut carbon. In yet another example, the third pre-filter 15b is a nano-silver activated carbon filter made of natural coconut carbon that is operable to filter out nanometer particles in the spectrum particle sizes between molecular and DNA. In yet another example, the third pre-filter 15b is a nano-silver activated carbon filter made of natural coconut carbon that is operable to filter out chloroform, VOCs, harmful chemicals, bad smells, and portions of metals and pesticides. In yet another example, the third pre-filter 15b is a nano-silver activated carbon filter made of natural coconut carbon that is operable to damage the mechanism of a bacteria's metabolism, resulting in filtering over six hundred and fifty species of bacteria. In yet another example, the third pre-filter 15b is a nano-silver activated carbon filter made of natural coconut carbon that is operable to have a flow rate of no more than 0.75 gallons per minute. In yet another example, the third pre-filter 15b is a nano-silver activated carbon filter made of natural coconut carbon that is operable to filter at least two thousand gallons of fluid before end-of-life. In yet another example, the third pre-filter 15b is a nano-silver activated carbon filter made of natural coconut carbon that is operable at no more than one hundred degrees Fahrenheit (100° F.).

After the fluid has been filtered by the third pre-filter media 15b, the fluid is transferred by a hose 17 (e.g., ½" OD transfer tube that is 10" long) to a fourth filter assembly 18. One end of the hose 17 is coupled to the third pre-filter housing 15a via the fitting 7. The other end of the hose 17 is coupled to the fourth filter housing 18a via the fitting 7. The fourth filter assembly 18 includes a fourth filter media 18b disposed in a fourth filter housing 18a. The fourth filter media 18b is operable to filter the fluid. In one example, the fourth filter media 18b is a carbon block filter rated at least 0.45 microns. In another example, the fourth filter media 18b is a carbon block filter that is operable to filter the fluid until the fourth filter media 18b is saturated with contaminants at which point, the fourth filter media 18b prohibits the flow of the fluid. A pressure gauge 19 is coupled between the third pre-filter assembly 15 and the fourth filter assembly 18 and is operable to display a pressure of the fluid entering the fourth filter assembly 18. A drop in pressure as displayed on the pressure gauge 19 may indicate an obstruction of the flow of the fluid from one of the pre-filter assemblies 13a, 15a, and 18a.

After the fluid has been filtered by the fourth filter media 18b, the fluid is transferred from the fourth filter housing 18a to a dispensing hose (e.g., ½ inch OD hose that is 4" long). One end of the dispensing hose 20 may be coupled to the fourth filter housing 18a via the fitting 7. The other end of the dispensing hose 20 may be coupled to a quick disconnect fitting 21, which may be used to attach a dispensing hose 32 (e.g., male end dispensing hose. In one example, the dispensing hose 20 is a female end dispensing hose. In one example, each filter housing 6a, 13a, 15a, and 18a may be clear plastic filter cases, which may be connected by a flexible hose to reduce damage due to rough handling, shock from accidents, or the like and may be operable for quick and easy changing of the corresponding filter media without disassembling the filter assembly.

Furthermore, the system 100 may be powered by one or more power supplies 2. In one example, a first power supply converts a higher alternating current (AC) voltage into a lower direct current (DC) voltage, allowing the system 100 to operate from an AC voltage in the range of 115V AC to 230V AC. In another example, a second power supply converts a higher DC voltage to a lower DC voltage. For instance, the second power supply converts 24V DC to 12V DC. In addition, the system 100 may be mounted to mounting brackets 1, 22. The system 100 may include an AC power chord 30 to provide AC power from a remote AC power supply to the system 100 or to charge the first power supply from the remote AC power supply. Also, the system 100 may include a DC power chord 29 (e.g., jumper cables) to provide DC power from a remote DC power supply or to charge the second power supply from the remote DC power supply. The system 100 may also include a power adaptor 31 that is operable to perform the functions of the first or second power supply. The mounting bracket 1 may be used to mount the power supply 2 and the pump assembly 3. The mounting bracket 22 may be used to mount the filter assemblies 6, 13, 15, 18. In one example, each mounting bracket 1, 22 is ninety thousandths of one inch (90 mils) thick aluminum. The system 100 mounted to the brackets 1, 22 may be disposed in a watertight case 35 that may include an automatic equalization valve. The system 100 may also include a wrench 28 (e.g., strap wrench) for providing grip and mechanical advantage in applying a torque to turn one of the filter housings 6a, 13a, 15a, 18a to install or uninstall that housing 6a, 13a, 15a, 18a to a head, as shown in FIG. 13.

Figure 3A:
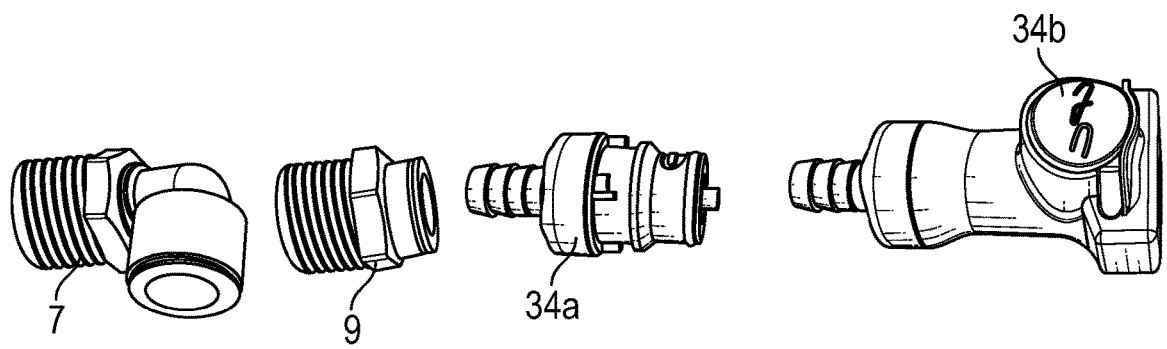
FIGS. 3A-B illustrate fittings of the system of FIGS. 1A-G.
Figure 3B:
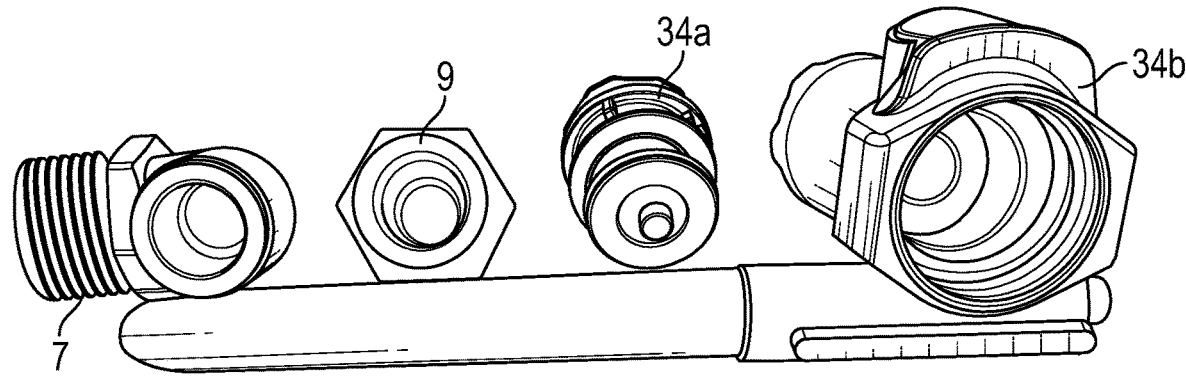
Figure 3C:
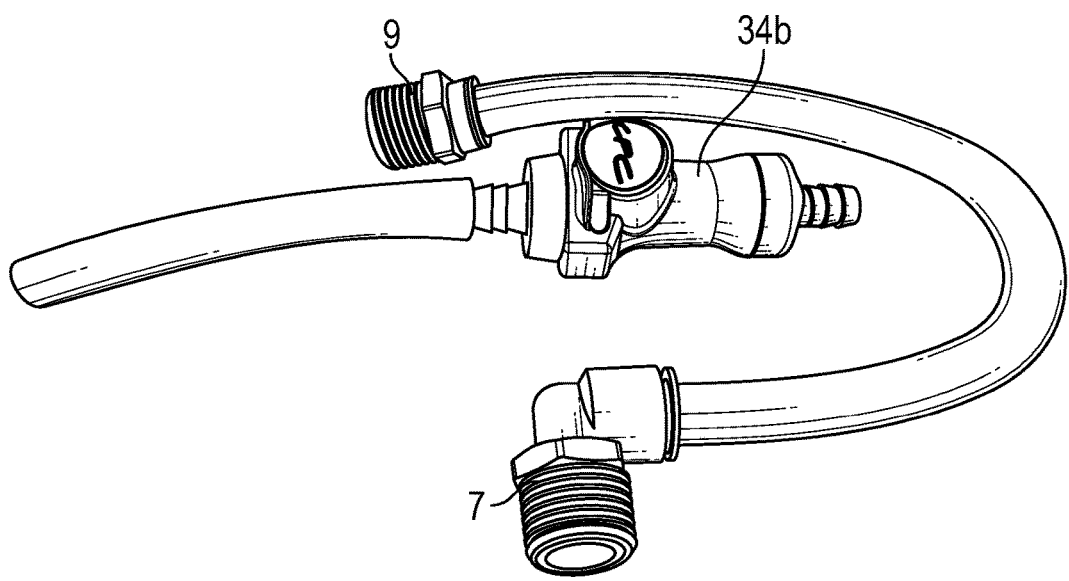
FIG. 3C illustrates assembled fittings and hoses.

The right portion of FIGS. 3A-B illustrate the quick disconnect fitting 34 having a female quick disconnect fitting 34a and a male quick disconnect fitting 34b. The left, center portion of FIG. 3C illustrates the fitting 34 coupled to a corresponding hose. The left portion of FIGS. 3A-B illustrate the fittings 7, 9. The right, outer portion of FIG. 3C illustrates the fittings 7, 9 coupled to a corresponding hose.

Figure 4:
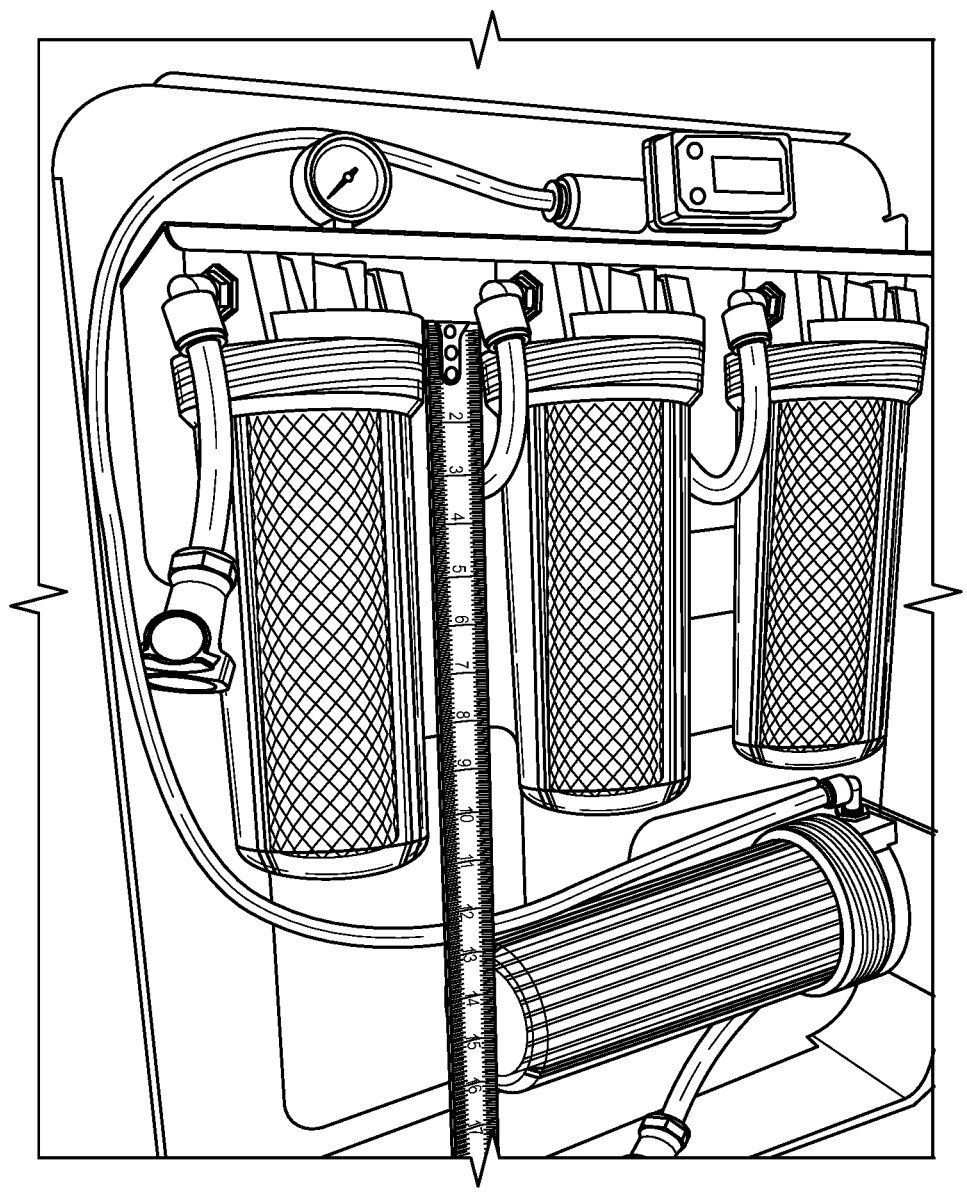
FIG. 4 illustrates the system of FIGS. 1A-G with filter media disposed in the filter housings in accordance with various aspects as described herein.

FIG. 4 illustrates the system of FIGS. 1A-G with various filter media disposed in the filter housings in accordance with various aspects as described herein.

Figure 5A:
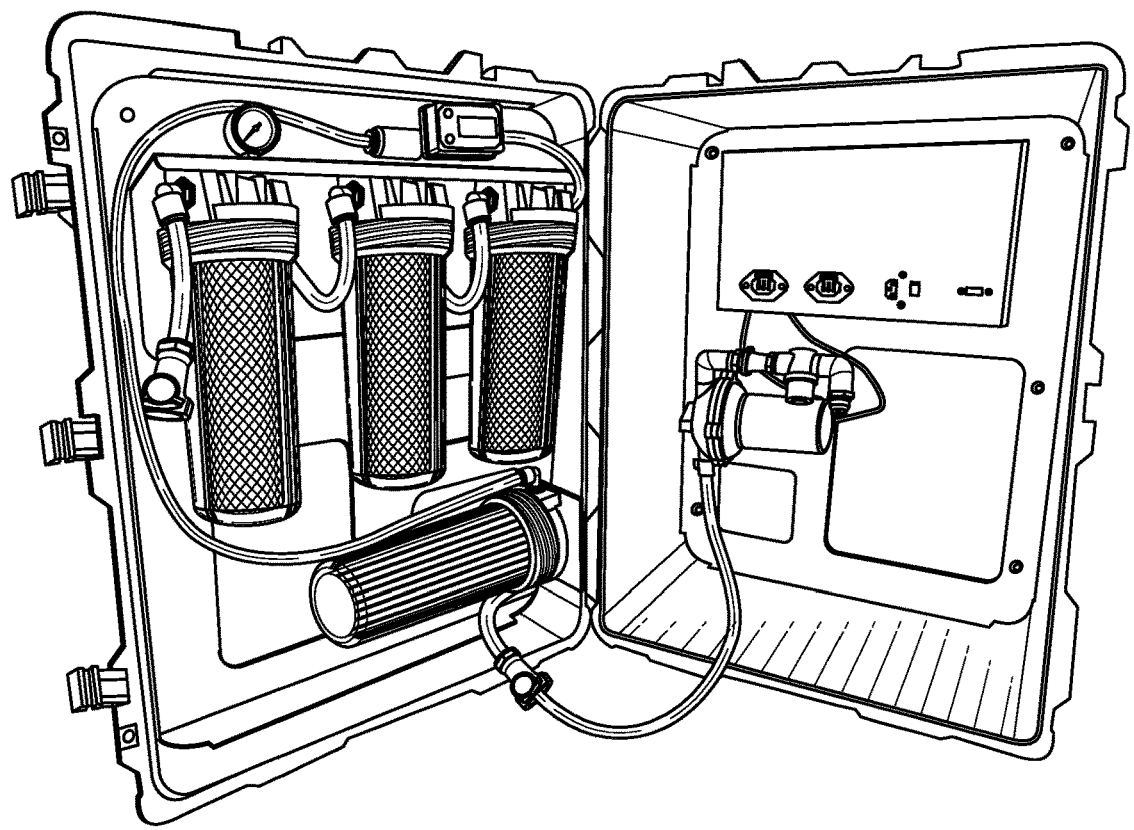
FIGS. 5A-B illustrates different views of the system of FIGS. 1A-G.
Figure 5B:
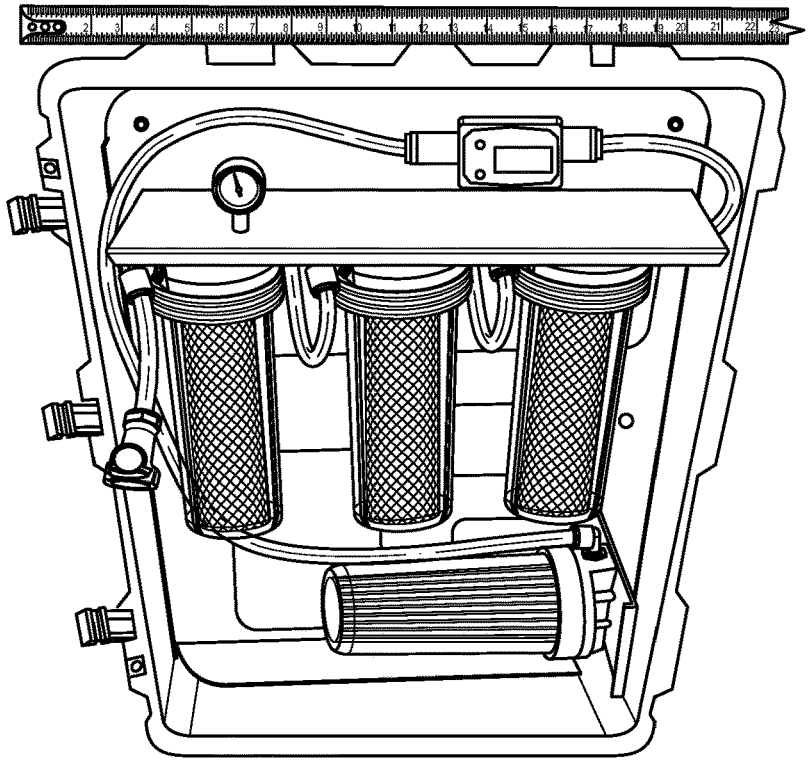

FIGS. 5A-B illustrates different views of the system of FIGS. 1A-G.

Figure 6C:
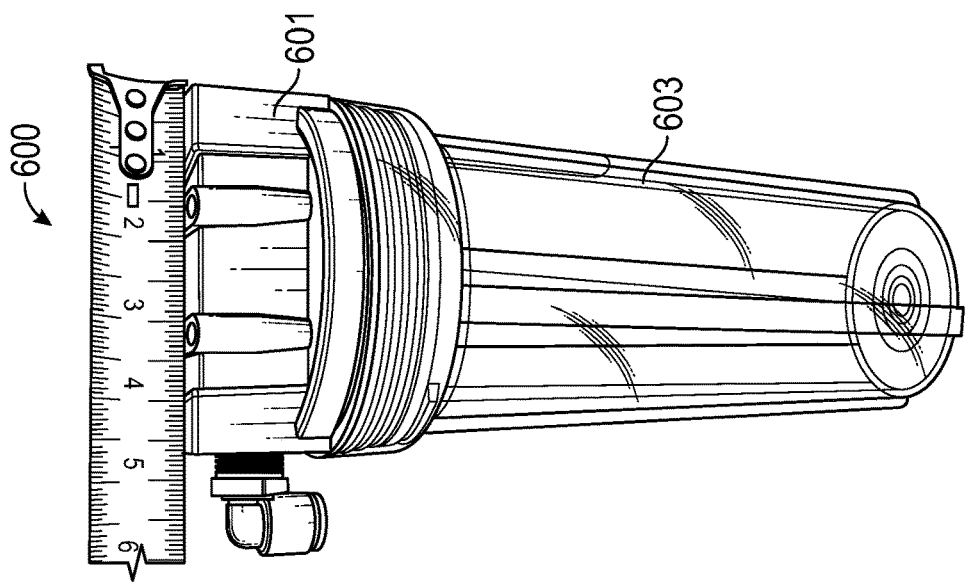
FIGS. 6A-C illustrates different views of one embodiment of a filter housing in accordance with various embodiments as described herein.
Figure 6B:
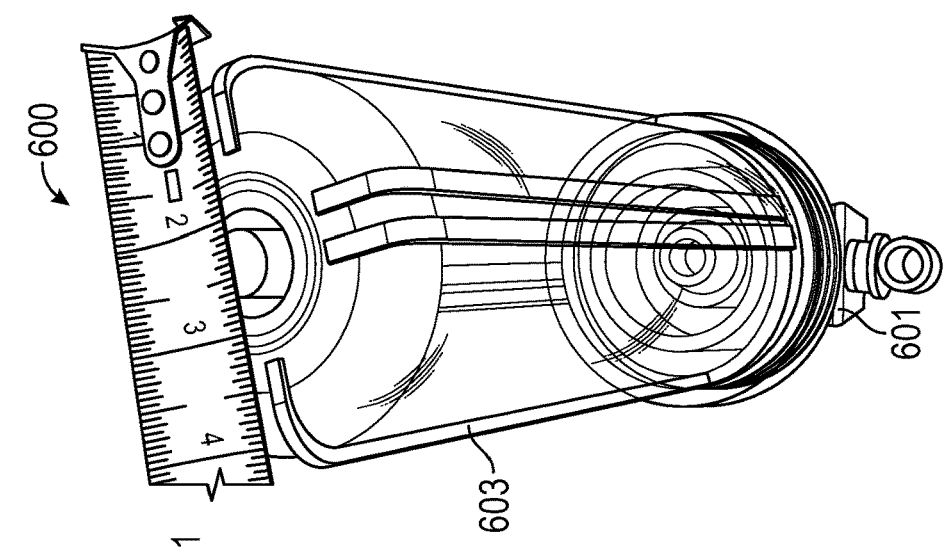
Figure 6A:
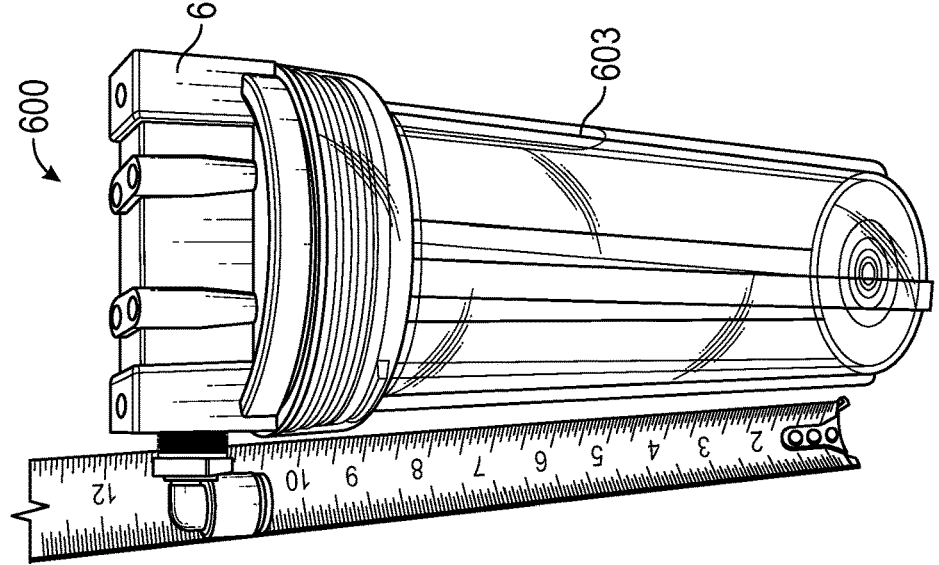

FIGS. 6A-C illustrates different views of one embodiment of a filter housing 600 having a head 601 and a body 603 in accordance with various embodiments as described herein.

Figure 7:
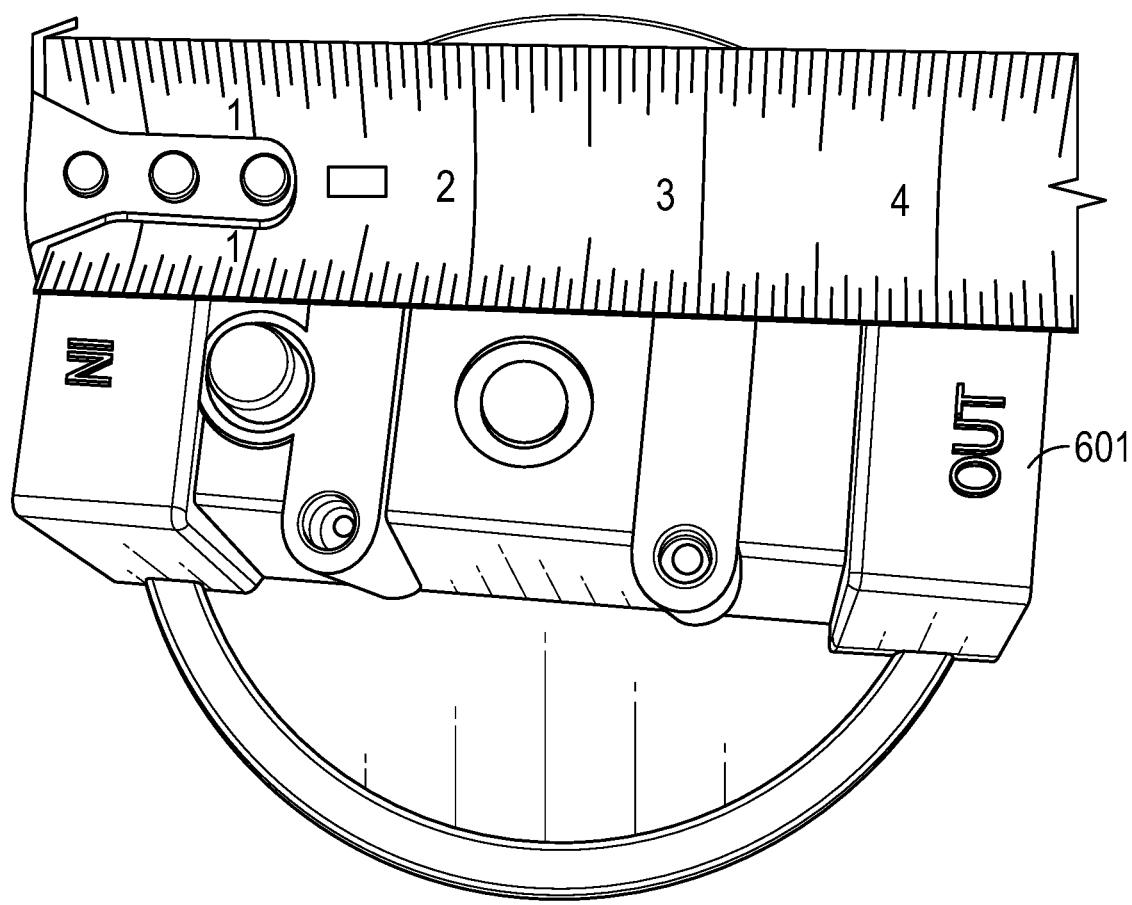
FIG. 7 illustrates one embodiment of a head of a filter housing in accordance with various embodiments as described herein.

FIG. 7 illustrates a top view of the head 601 of FIGS. 6A-C.

Figure 8:
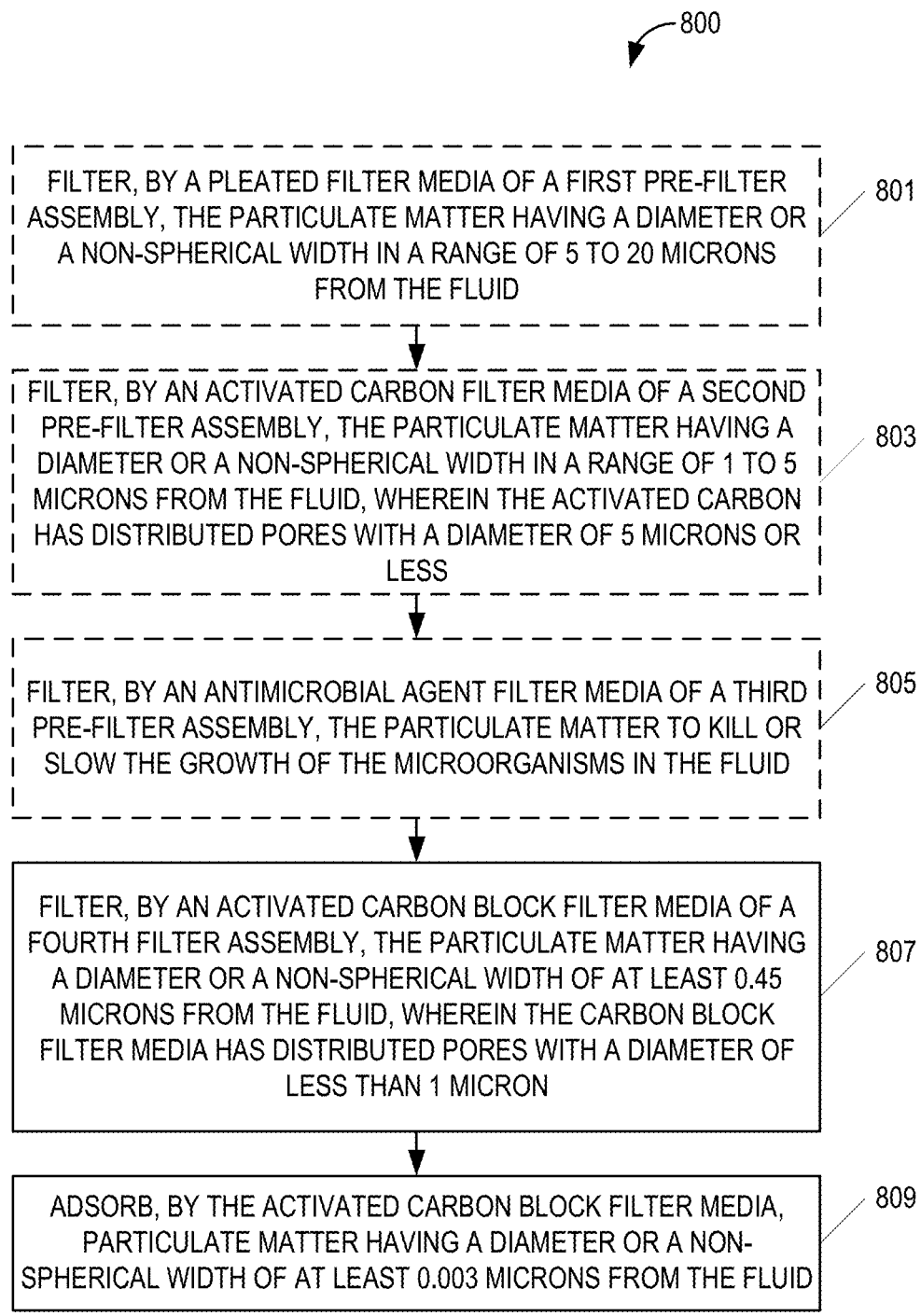
FIG. 8 illustrates one embodiment of a method of filtering particulate matter having suspended particles, organic contaminants, and microorganisms from a fluid in accordance with various aspects as described herein.

FIG. 8 illustrates one embodiment of a method 800 of filtering particulate matter having suspended particles, organic contaminants, and microorganisms from a fluid in accordance with various aspects as described herein. In FIG. 8, the method 800 may start, for instance, at block 801 where it may include filtering, by a first pre-filter assembly having a pleated filter media disposed therein. Further, the particulate matter may have a diameter or a non-spherical width in a range of five to twenty microns from the fluid. At block 803, the method 800 may include filtering, by a second pre-filter assembly having activated carbon filter media disposed therein, the particulate matter having a diameter or a non-spherical width in a range of one to five microns from the fluid. Also, the activated carbon filter media has distributed pores with a diameter of five microns or less. At block 805, the method 800 may include filtering, by a third pre-filter assembly having an antimicrobial agent filter media, the particulate matter to kill or slow the growth of the microorganisms in the fluid. At block 807, the method 800 includes filtering, by an activated carbon block filter media of a fourth filter assembly, the particulate matter having a diameter or a non-spherical width of at least 0.45 microns from the fluid from the liquid. The carbon block filter media has distributed pores with a diameter of less than one micron. In addition, the method 800 includes adsorbing, by the activated carbon block filter media, particulate matter having a diameter or a non-spherical width of at least 0.003 microns from the fluid.

Figure 9:
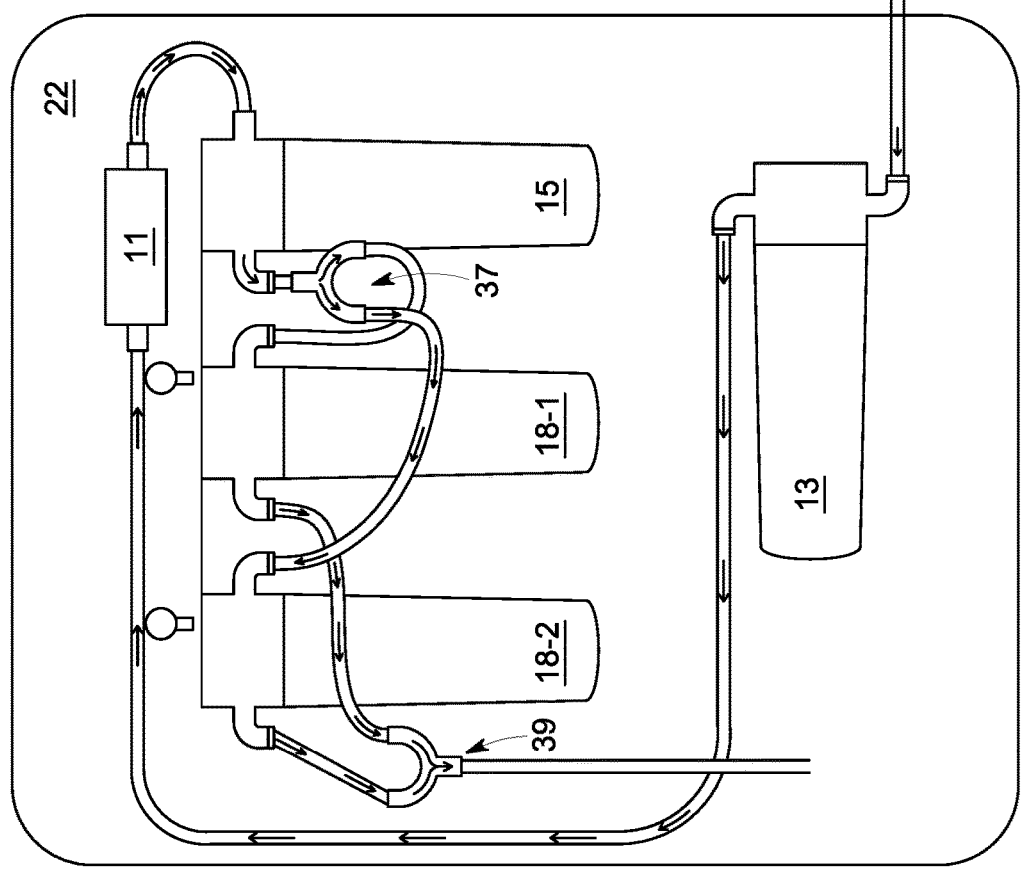
FIG. 9 illustrates another embodiment of a system for filtering particulate matter having suspended particles, organic contaminants, and/or microorganisms from a fluid in accordance with various aspects as described herein.

FIG. 9 illustrates another embodiment of a system 900 for filtering particulate matter having suspended particles, organic contaminants, and/or microorganisms from a fluid in accordance with various aspects as described herein. In FIG. 9, the pump 3 and the first pre-filter assembly 6 is mounted to the mounting bracket 1. Further, the second and third pre-filter assemblies 13, 15 are mounted to the mounting bracket 22. In addition, a plurality of the fourth filter assemblies 18-1, 18-2 are mounted to the mounting bracket 22. The filter configuration of the system 900 includes the outlet of the pump 3 being coupled to the first pre-filter assembly 6, which is coupled to the second pre-filter assembly 13, which is coupled to the third pre-filter assembly 15. The outlet port of the third pre-filter assembly 15 is coupled to a distributing connector 37 (e.g., y-connector) that is operable to distribute the flow of fluid from the outlet port of the third pre-filter assembly 15 into a plurality of parallel flows with each parallel flow directed towards the inlet port of one of the plurality of fourth filter assemblies 18-1, 18-2. Further, the outlet port of each fourth filter assembly 18-1, 18-2 is coupled to a combining connector 39 (e.g., y-connector) that is operable to combine the flow of fluid from the outlet port of each fourth filter assembly 18-1, 18-2 to obtain a combined fluid flow, which may be output to the dispensing hose 20. As previously mentioned, the fourth filter media 18b is a carbon block filter that is operable to filter the fluid until the fourth filter media 18b is saturated with contaminants at which point, the fourth filter media 18b prohibits the flow of the fluid. By using a plurality of fourth filter assemblies 18-1, 18-2, the volume of fluid filtered by the system 900 before the fourth filter media 18b of each fourth filter assembly 18-1, 18-2 becomes saturated with contaminants (and hence, prohibiting the flow of fluid) is linearly proportional to the number of fourth filter assemblies 18-1, 18-2 operating in parallel. For instance, a system having two fourth filter assemblies operating in parallel will filter twice the volume of fluid than a system having a single fourth filter assembly.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A system for filtering particulate matter having suspended particles, organic contaminants, and microorganisms from a fluid, comprising:
   a first pre-filter assembly including a pleated sediment filter;
   a second pre-filter assembly including a carbon block microfilter;
   a third pre-filter assembly including an antimicrobial agent filter media; and
   a main filter assembly having an activated carbon block disposed therein, the carbon block having distributed pores with a diameter of less than 1 micron and being operable to:
      filter particulate matter having a diameter or a non-spherical width of at least 0.45 microns from the fluid; and
      adsorb particulate matter having a diameter or a non-spherical width of at least 0.003 microns from the fluid; and
   wherein the first pre-filter assembly is arranged to filter the fluid prior to the second pre-filter assembly, the second pre-filter assembly is arranged to filter the fluid prior to the third pre-filter assembly, and the third pre-filter assembly is arranged to filter the fluid prior to the main filter assembly.

2. The system of claim 1, wherein the pleated sediment filter is operable to filter particulate matter having a diameter or a non-spherical width in a range of 5 to 20 microns from the fluid.

3. The system of claim 1, wherein the carbon block microfilter includes distributed pores with a diameter of 5 microns or less, and wherein the carbon block microfilter is operable to filter particulate matter having a diameter or a non-spherical width in a range of 1 to 5 microns from the fluid.

4. The system of claim 1, wherein the antimicrobial agent filter media is operable to kill or slow a growth of the microorganisms in the fluid.

5. The system of claim 4, wherein the third pre-filter assembly is operable to filter particulate matter having a diameter or a non-spherical width in a range of 1 to 5 microns.

6. The system of claim 1, wherein the arrangement of the first, second and third pre-filter assemblies and the main filter assembly is operable to allow the main filter assembly to filter a greater volume of fluid prior to reaching its end-of-life than any other arrangement of the first, second and third pre-filter assemblies and the main filter assembly.

7. The system of claim 1, wherein the arrangement of the first, second and third pre-filter assemblies and the main filter assembly is operable to allow the main filter assembly to filter at least 20% greater volume of the fluid prior to reaching its end-of-life than any other arrangement of the first, second and third pre-filter assemblies and the main filter assembly.

8. The system of claim 1, further comprising:
   a filter screen disposed in an intake port and operable to filter the particulate matter having a diameter or a non-spherical width of at least 0.297 millimeters from the fluid.

9. The system of claim 1, wherein the activated carbon block is a compressed, food-grade, activated coconut carbon block.

10. The system of claim 1, further comprising:
    a pump connected to the first pre-filter assembly.

11. The system of claim 10, further comprising:
    a pressure gauge arranged at an inlet port to the main filter and operable to:
       monitor a flow of fluid to the main filter; and
       actuate an indicator positioned on the pressure gauge when the pressure of fluid flowing to the main filter reaches a threshold value.

* * * * *